July 8, 1952 — G. W. JOHNSON — 2,602,185
POULTRY SINGEING MACHINE
Filed Dec. 14, 1946 — 3 Sheets-Sheet 1

INVENTOR,
Gordon W. Johnson.
BY Roy I. Hamilton

INVENTOR.
Gordon W. Johnson.

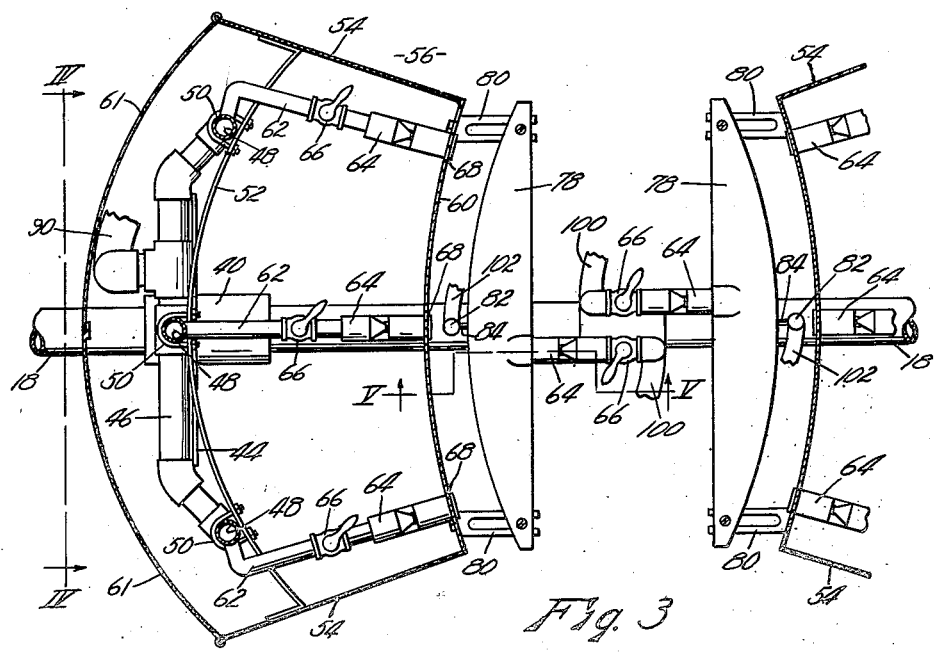
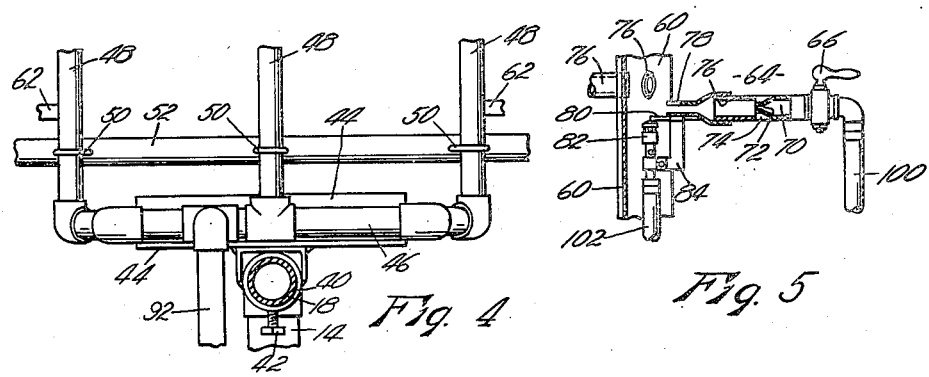
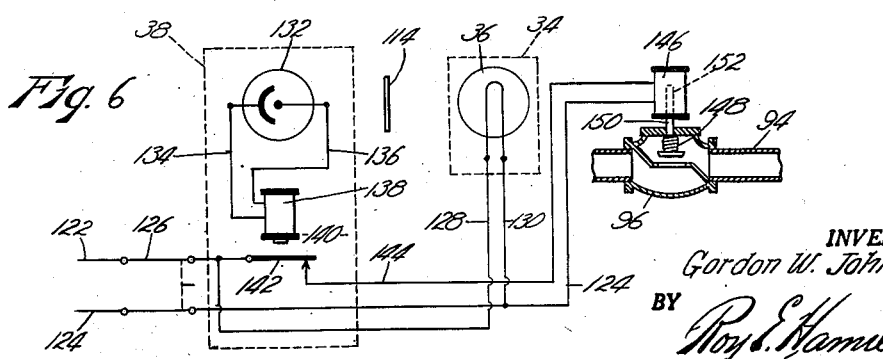

Patented July 8, 1952

2,602,185

UNITED STATES PATENT OFFICE 2,602,185

POULTRY SINGEING MACHINE

Gordon W. Johnson, Raytown, Mo., assignor to Gordon Johnson Company, Kansas City, Mo., a corporation of Missouri Application December 14, 1946, Serial No. 716,360

5 Claims. (Cl. 17—11)

This invention relates to new and useful improvements in a poultry singeing machine, and has particular reference to a machine for singeing poultry suspended from a continuously moving conveyor.

In poultry processing plants wherein feathers are removed from fowl suspended from a moving conveyor by mechanical poultry pickers, a small amount of fine hair and feathers will remain on each bird at inaccessible parts of the body, such as the wings, the neck, and the legs. Since these feathers must be removed by singeing before the fowl may be further processed, it is evident that a substantial saving of time would be effected by the provision of an automatic means whereby each fowl may be singed without removing said fowl from the conveyor line.

The principal object of the present invention is, therefore, the provision of an automatic means for singeing poultry on the line.

A further object is the provision of a poultry singer wherein the duration of the singeing flame is automatically controlled to prevent possible burning of the fowl.

Other objects are simplicity and economy of construction, efficiency of operation, and adaptability to singe fowls of any size.

With these objects in view, as well as other objects which will become apparent during the course of the specification, reference will be had to the drawings, wherein:

Fig. 3 is an enlarged fragmentary horizontal section taken on line III—III of Figure 1.

Fig. 4 is a fragmentary vertical section taken on line IV—IV of Figure 3, with the access doors of the burner cabinet removed.

Fig. 5 is a fragmentary vertical section taken on line V—V of Figure 3.

Fig. 6 is a diagrammatic view of the electrical circuit by which the gas supply to the singer is controlled.

Figure 1:
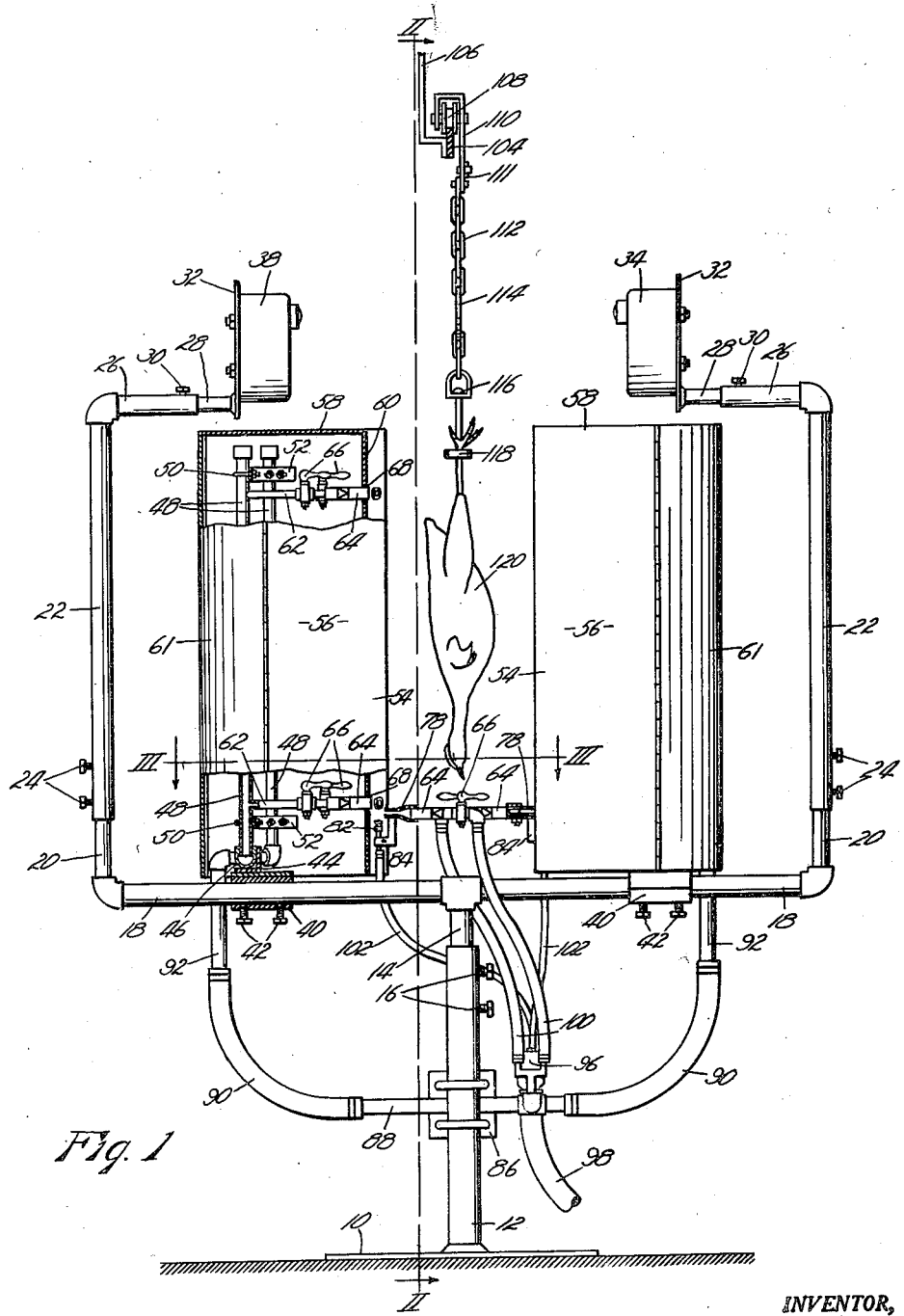
Figure 1 is a front elevation of a poultry singeing machine embodying the present invention, showing a fowl suspended in operative relationship thereto from a conveyor, and with portions of one of the burner cabinets broken away.

Like reference numerals apply to similar parts throughout the several views, and the numeral 10 refers to a floor engaging base carrying a frame constructed of piping and comprising a vertical pipe 12 rigidly attached to said base, a pipe 14 slidable in pipe 12 and adjustably fixed thereto by set screws 16, a horizontal pipe 18 interconnected with pipe 14 at the upper end thereof and extending equally in opposite directions therefrom, a vertically upwardly extending pipe 20 fixed to pipe 18 at each end thereof, a pipe 22 slidably carried on each of pipes 20 and adjustably fixed thereto by set screws 24, an inwardly extending horizontal pipe 26 fixed to each of pipes 22 at the upper ends thereof, and a pipe 28 slidable in each of pipes 26 and adjustably fixed thereto by set screws 30.

Fixed to the inner end of each of pipes 28 is a mounting plate 32. To one of said mounting plates is attached a lamp housing 34 containing a lamp 36 and to the other is firmly fixed a photoelectric switch 38, the light from said lamp being adapted to impinge on said photoelectric switch and thereby control the operation of a solenoid operated gas control valve, as hereinafter described.

Slidably carried on horizontal pipe 18 on each side of pipe 14 is a slide 40, which may be adjustably fixed to pipe 18 by set screws 42. Rigidly attached to each of said slides above pipe 18 is an angle iron support 44 to which is welded a header pipe 46. Interconnected with said header pipe are a plurality of vertically extending header pipes 48, as shown in Figures 3 and 4. Rigidly attached to said vertical header pipes by means of U-bolts 50 are a plurality of horizontal support members 52, the outer ends of which are rigidly attached to and which support sides 54 of burner cabinet 56, as shown in Figure 3. Said burner cabinet comprises sides 54, top 58, an arcuate front 60, and hinged access doors 61 closing the rearward side of said cabinet.

Interconnected with each of header pipes 48 at spaced intervals thereon are a plurality of forwardly extending pipes 62, each of said pipes carrying at its forward end a gas burner 64, and being supplied with a stop cock 66, by means of which the gas supply to each of said burners may be individually regulated. Gas burners 64 associated with each vertical header 48 are convergent with the burners associated with the other headers 48, and all of said burners extend forwardly through holes 68 provided therefor in front 60 of cabinet 56, as shown in Figure 3. As shown in Figure 5, each of said gas burners comprises essentially an entrance chamber 70 at the forward end of which is a restricted orifice 72 through which gas passes in a high speed jet, air inlets 74 through which air is drawn into said burner by said jet, and a tubular chamber 76 in which said gas and air are mixed.

Figure 2:
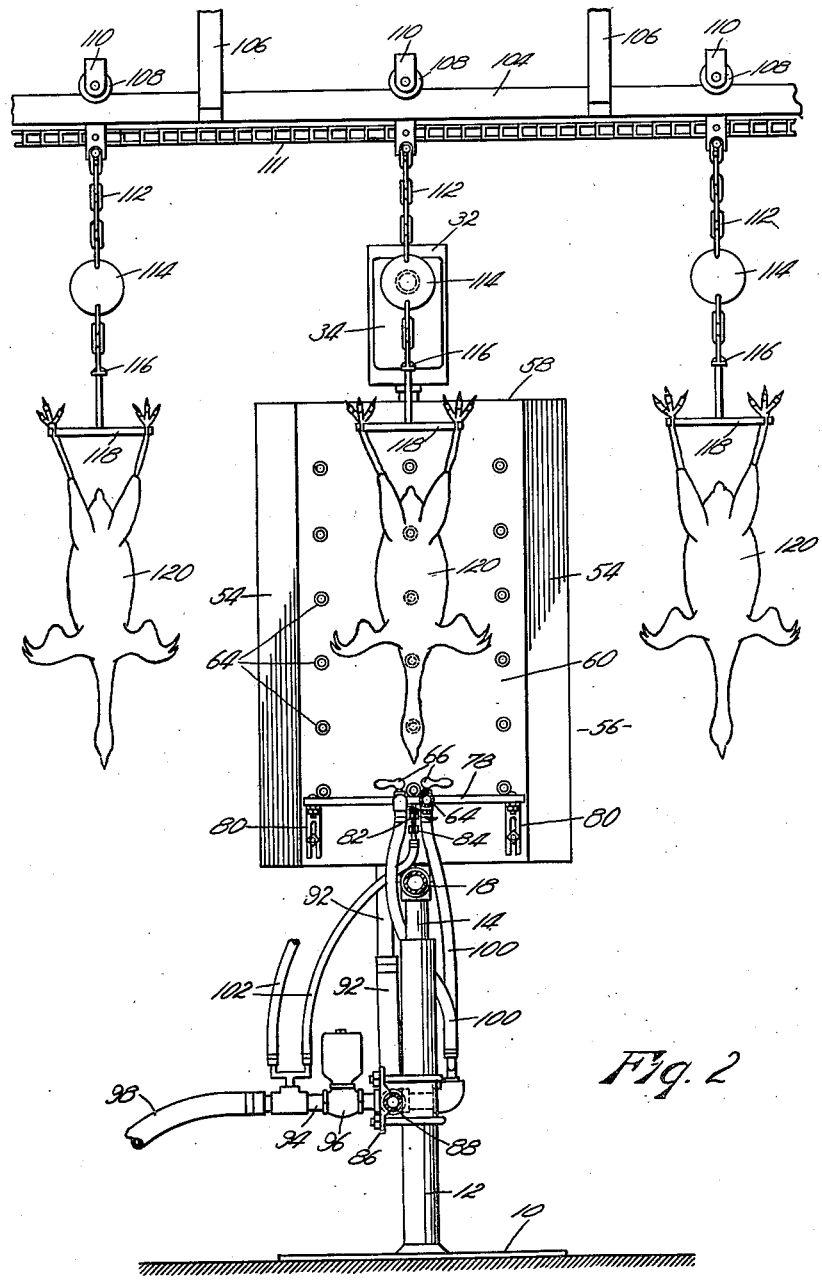
Fig. 2 is a vertical section taken on line II—II of Figure 1.

A flame spreader 78 is attached to front 60 of each burner cabinet 56 adjacent the lower edge thereof by means of brackets 80, as shown in Figures 2 and 3, said brackets being slotted to allow adjustment of said flame spreaders both vertically and horizontally. Each of said flame spreaders supports a gas burner 64, and is adapted to spread the flame of said burner across substantially the entire width of cabinet 56. A small pilot burner 82 is supported immediately beneath the edge of flame spreader 78 at substantially the midpoint thereof by means of a bracket 84 rigidly attached to the lower side of said flame spreader.

Adjustably clamped to frame pipe 12 by means of clamp 86 is a horizontal pipe 88, each end of said pipe being interconnected by means of a flexible hose 90 and pipe 92 with a header 46 supplying burners 64, as shown in Figure 1. Interconnected with pipe 88 at a point intermediate its ends is a pipe 94 in which is included a solenoid valve 96 controlled by thermoelectric switch 39 as hereinafter described, and which is connected by hose 98 with a suitable source of gas.

A flexible hose 100 interconnects each of burners 64 supported by flame spreaders 78 with pipe 88 at a point intermediate its ends. A flexible hose 102 interconnects each pilot burner 82 with pipe 94 at a point behind solenoid valve 96.

The poultry singeing machine is so disposed with relationship to a conveyor line that fowl traveling on said conveyor pass between burner cabinets 56, as shown in Figures 1 and 2. Ordinarily, said conveyor comprises a rail 104 supported by brackets 106, and along which roll flanged rollers 108, which are rotatably mounted in carrier members 110. Said carrier members are maintained in spaced relationship on rail 104, and moved along said rail by conveyor chain 111. Suspended from each of said carrier members is a chain 112 in which is interposed an opaque interrupter disc 114 adapted to pass between lamp housing 34 and photoelectric switch 38, as shown in Figures 1 and 2. Suspended from the lower end of chain 112 by means of swivel connection 116 is a suitable shackle 118 for releasably engaging the legs of a fowl 120.

Referring to Figure 6, it will be seen that wires 122 and 124, which are connected with a suitable source of electric current which may be controlled by switch 126, are respectively connected by means of wires 128 and 130 with lamp 36 contained in lamp housing 34, said lamp thus continuing to burn as long as switch 126 is closed.

Photoelectric switch 38 comprises a photoelectric cell 132 connected by wires 134 and 136 with coil 138 of sensitive relay 140, the armature 142 of said relay forming a switch controllable by said coil, said switch being normally closed. Wire 122 is connected to one terminal of said switch, and the other terminal of said switch is connected by wire 144 with the solenoid coil 146 of solenoid operated valve 96. Wire 124 is also connected with said coil. Said valve is normally held in a closed position by spring 148, and the stem 150 of said valve is extended to form the armature 152 of said solenoid. Thus it will be seen that as long as light from lamp 36 falls on photoelectric cell 132, coil 138 will be energized and armature 142 will be retained thereby in the open position and valve 96 will be held closed by spring 148. However, when interrupter disc 114 passes between said lamp and said photoelectric cell, coil 138 will not be energized and armature 142 will be allowed to close the circuit to solenoid coil 146. Armature 152 of said solenoid will then be drawn into said coil thus opening valve 96 and allowing gas to flow through pipe 94.

The operation of the poultry singeing machine is substantially as follows. After the singer has been disposed in proper relationship to the conveyor, as described above, the elevation of burner cabinets 56 with respect to said conveyor may be adjusted by loosening set screws 16 and slidably raising or lowering pipe 14 in pipe 12. Photoelectric switch 38 and lamp housing 34 may be adjusted to proper horizontal alignment with interrupter discs 114 by loosening set screws 24 and slidably raising or lowering pipes 22 on pipes 20. The distance between burner cabinets 56 may be adjusted to the size of the poultry to be singed by loosening set screws 42 and moving slides 40 along pipe 18.

Gas is then supplied to the singer through hose 98, switch 126 is closed, and the conveyor set in motion. Pilot burners 82 are then lit and will continue to burn as long as the gas supply is maintained, since they are interconnected with pipe 94 behind solenoid valve 96. As long as light from lamp 36 falls on photoelectric cell 132, relay 140 will remain open, and solenoid valve 96 will remain closed, as previously described. Thus, no gas will be supplied either to burners 64 in burner cabinets 56, or to the burners 64 carried by flame spreaders 78.

However, when the conveyor moves a fowl between burner cabinets 56, the light beam between lamp 36 and photoelectric cell 132 is cut by interrupter disc 114 carried by chain 112. As previously described, said photoelectric cell will then allow relay 140 to close the circuit to solenoid 146 of solenoid valve 96, and said valve will be opened against pressure of spring 148. Gas burners 64 will thereby be supplied with gas. Gas flowing through said burners carried by flame spreaders 78 will be ignited by pilot burners 82, and the flame therefrom will be spread by said flame spreaders across substantially the entire width of said burner cabinets. This flame will in turn ignite the lowermost burners 64 contained in cabinets 56. The flame from said last named burners will in turn ignite the burners immediately above, the process continuing until all of burners 64 are ignited. Burners 64 may be adjusted to furnish flames of substantially equal length by adjusting the gas supply to each burner by means of the associated stop cock 66. Said flames converge inwardly against the fowl 120 between cabinets 56, singeing all feathers and hairs remaining thereon, and said flames will continue until interrupter disc 114 is carried out of line with lamp 36 and photoelectric cell 132. When this occurs, said photoelectric cell will reopen relay 140, breaking the circuit to solenoid 146, and valve 96 will be closed by spring 148, cutting off the supply of gas to burners 64.

The duration of the singeing flames is thus controlled by the size of interrupter discs 114 and the speed of the conveyor.

The size of said interrupter discs must be such that taken in conjunction with the speed of the conveyor, singeing flames will be applied to each fowl for sufficient time to singe it thoroughly, and yet not long enough to burn the skin or otherwise cause damage. This time will ordinarily be in the order of perhaps five seconds.

Features of the present singeing machine are fully automatic operation, conservation of fuel, elimination of an extra handling of the fowl ordinarily required for singeing, and adaptability to poultry of any size.

The improvements I claim as new and desire to protect by Letters Patent are:

1. In a poultry singeing machine, a pair of spaced, upright supports; conveyor means associated with said supports for advancing a bird between the supports; a plurality of fuel discharge devices carried by each support respectively and disposed to direct flame toward the bird as the same is advanced between the supports, means on said machine for igniting the fuel emanating from said devices; an electrically operable, normally closed valve connected with said fuel discharge devices for controlling flow of fuel to the devices; an electric control for said valve associated with said conveyor, including a photoelectric cell and an exciter lamp for directing a beam of light toward the photoelectric cell outside the path of travel of the bird; and interceptor means carried by said conveyor means for movement thereby between the photoelectric cell and the exciter lamp to block said beam of light from the photoelectric cell as the bird moves between the supports, whereby to open the valve only while the interceptor means blocks the beam of light and while the bird is between the supports.

2. In a poultry singeing machine as set forth in claim 1 wherein said means for igniting the fuel emanating from said fuel devices comprises burner means on each support respectively, separate from said devices, for presenting a constantly burning pilot flame, whereby said fuel is automatically ignited upon opening of said valve.

3. In a poultry singeing machine as set forth in claim 1 wherein said means for igniting the fuel emanating from said fuel devices comprises burner means on each support respectively, separate from said devices, for presenting a constantly burning pilot flame, whereby said fuel is automatically ignited upon opening of said valve, and wherein each burner means respectively has means for spreading the flame thereof transversely across the corresponding support, whereby said fuel is instantly ignited upon opening of the valve.

4. In a poultry singeing machine as set forth in claim 1 wherein the fuel discharge devices are arranged in a plurality of vertical rows on their corresponding supports, and wherein the devices of certain rows are disposed to direct fuel along convergent paths of travel toward the opposite support.

5. In a poultry singeing machine as set forth in claim 1 wherein the supports are transversely arcuate with the concave surfaces thereof in facing relationship, and wherein the fuel discharge devices are arranged in a plurality of vertical rows on their corresponding supports and include fuel outlet pipes perpendicular to their supports.

GORDON W. JOHNSON.

REFERENCES CITED

The following references are of record in the file of this patent:

UNITED STATES PATENTS

| Number | Name | Date |
| --- | --- | --- |
| 1,530,022 | Van Dusen | Mar. 17, 1925 |
| 1,975,196 | De Vout | Oct. 2, 1934 |
| 2,088,676 | White | Aug. 3, 1937 |
| 2,140,399 | Connolly | Dec. 13, 1938 |
| 2,188,401 | Crowley | Jan. 30, 1940 |
| 2,412,338 | Jasper | Dec. 10, 1946 |

FOREIGN PATENTS

| Number | Country | Date |
| --- | --- | --- |
| 737,569 | France | Oct. 4, 1932 |